United States Patent
Mizuyabu et al.

(10) Patent No.: US 6,297,832 B1
(45) Date of Patent: Oct. 2, 2001

(54) METHOD AND APPARATUS FOR MEMORY ACCESS SCHEDULING IN A VIDEO GRAPHICS SYSTEM

(75) Inventors: Carl K. Mizuyabu, Thornhill; Paul Chow; Philip L. Swan, both of Richmond Hill; Chun Wang, Toronto, all of (CA)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/224,692

(22) Filed: Jan. 4, 1999

(51) Int. Cl.[7] .................................................. G06G 5/399
(52) U.S. Cl. ........................... 345/540; 345/353; 345/531
(58) Field of Search ........................................ 345/531–535, 345/540, 502, 501, 569, 555; 711/5, 100, 154, 157, 158, 170, 173

(56) References Cited

U.S. PATENT DOCUMENTS

| | | | |
|---|---|---|---|
| 5,664,162 | * 9/1997 | Dye | 345/521 |
| 5,793,693 | * 8/1998 | Collins et al. | 365/230.01 |
| 5,912,676 | * 6/1999 | Malladi et al. | 345/521 |
| 5,937,204 | * 8/1999 | Schinnerer | 345/508 |
| 6,064,407 | * 5/2000 | Rogers | 345/516 |
| 6,204,863 | * 3/2001 | Wilde | 345/515 |

\* cited by examiner

*Primary Examiner*—Kee M. Tung
(74) *Attorney, Agent, or Firm*—Vedder, Price, Kaufman & Kammholz

(57) ABSTRACT

A method and apparatus for sequencing memory accesses in a video graphics system such that page faults are effectively hidden is accomplished by receiving a memory access request from one of a plurality of clients, where the plurality of clients includes both linear clients and tiled memory clients. The clients access data stored in a memory that includes at least two banks. Once the memory request has been received, it is evaluated based on other pending requests in order to determine the optimal ordering pattern for execution of the memory requests. The optimal ordering pattern typically includes sequencing alternating accesses between the two banks of the memory such that when a page fault is occurring in one bank of the memory, a memory access is occurring in the opposing bank. Once the ordering of the memory requests has been performed, the requests are executed.

20 Claims, 3 Drawing Sheets

METHOD AND APPARATUS FOR MEMORY ACCESS SCHEDULING IN A VIDEO GRAPHICS SYSTEM

FIELD OF THE INVENTION

The invention relates generally to video graphics processing and more particularly to a method and apparatus for memory access scheduling in a video graphics system.

BACKGROUND OF THE INVENTION

Video information and rendered graphical images are being combined in an increasing number of applications. Examples include animated icons, on screen menus, video windows in a graphical display, etc. As increasingly integrated systems are developed, common circuitry within the systems must satisfy the needs of both the graphical image processing and the video image processing. One example of such a shared resource is memory.

Graphical information is typically stored in memory in a linear format. In a linear format, data is typically stored sequentially in a localized portion of the memory and accessed in a similar sequential manner. Video information, however, is often stored in a tiled format that allows small, localized portions of a video image to be accessed more rapidly. In an integrated video graphics system, both of these formats must be supported by the circuitry that controls memory accesses.

Because the video information and the graphical information are processed and displayed concurrently, it is important that the two types of data are able to be stored and retrieved from the memory in an efficient manner. One of the problems that arises in storing and retrieving these different types of data from memory is the timing penalties associated with page faults. A page fault occurs when a read or write to one page in memory is immediately followed by a read or write to a different page in the memory block. In order to prepare the memory for the access to the new memory block, additional time must be incurred. In the situation where there is frequent toggling between different memory clients within the video graphics system, each of which may be accessing data on different pages, it is important to try and mask or hide the timing penalties associated with these page faults.

In prior arts systems, linear memory clients typically stored large blocks of linear data within a single page of the memory. Tiled clients typically perform scattered accesses to smaller portions of the memory, each of which may be located on a separate page. In this prior art situation, it is very difficult to hide page faults because all of the accesses are occurring within a single block or portion of the memory. Thus, in most cases, when a client began a new access to the memory, the timing penalties associated with a page fault would be incurred.

In mixed video graphics systems, real time video is often displayed. In such situations, it is very important that the memory accesses that retrieve both video and graphical information for display are as efficient as possible in order to insure that video frames are not dropped or rendered in a corrupted manner. In such situations, the penalties associated with page faults are very detrimental to the operation of the system. Although one solution to the problem associated with page faults is to add additional memory blocks or increase the bandwidth of the memory to compensate for the penalties, these solutions add cost and complexity to the system, thus removing some of the benefits of integration.

Therefore a need exists for a method and apparatus for sequencing memory accesses such that the penalties associated with page faults are avoided or effectively hidden when they are unavoidable.

DETAILED DESCRIPTION OF A PREFERRED EMBODIMENT OF THE INVENTION

Figure 1:
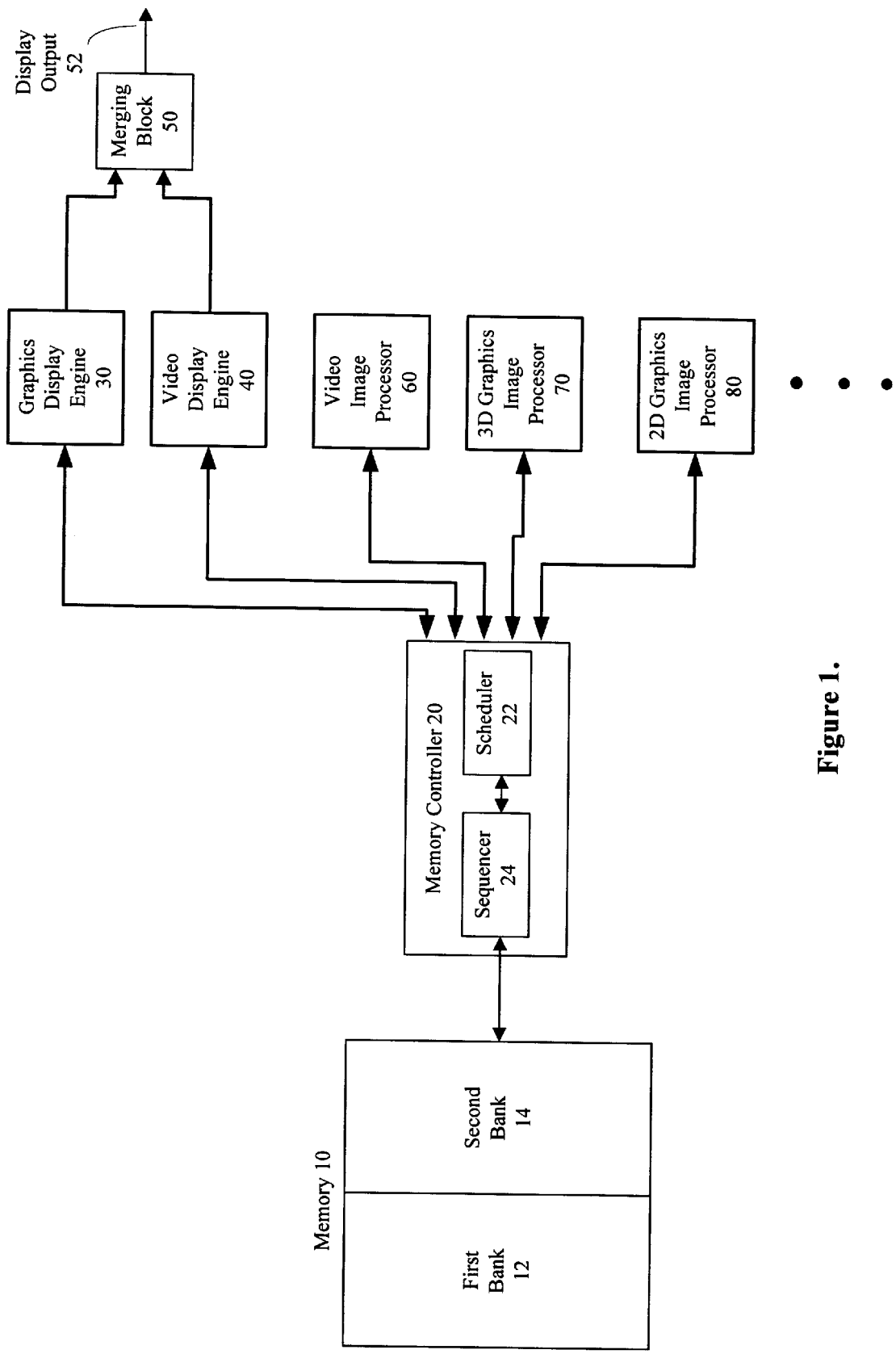
FIG. 1 illustrates a block diagram of a video graphics circuit in accordance with the present invention.

Generally, the present invention provides a method and apparatus for sequencing memory accesses in a video graphics system such that page faults are effectively hidden. This is accomplished by receiving a memory access request from one of a plurality of clients, where the plurality of clients includes both linear clients and tiled memory clients. The clients access data stored in a memory that includes at least two banks. Once the memory request has been received, it is evaluated based on other pending requests in order to determine the optimal ordering pattern for execution of the memory requests. The optimal ordering pattern typically includes sequencing alternating accesses between the two banks of the memory such that when a page fault is occurring in one bank of the memory, a memory access is occurring in the opposing bank. By ensuring that an effective access takes place in one bank while the other bank prepares to access memory that is incurring a page fault, efficiency of the memory accesses can be greatly enhanced. Once the ordering of the memory requests has been performed, the requests are executed.

By recognizing that the regularity of linear memory accesses can be utilized to conceal page faults that are typically associated with tiled memory clients, a video graphics system employing the method and apparatus described herein can minimize the detrimental effects of page faults. In order to take advantage of the regularity of the linear clients accesses, a two bank memory structure is employed that allows setup operation for an access to one bank of memory to occur while a read or write operation is simultaneously occurring in the opposite bank.

Throughout the specification, linear memory clients should be understood to include those memory clients that typically perform sequential-type access that are more consistent and regular in their patterns of access. Tiled clients include region-oriented clients that typically perform more scattered accesses throughout the memory. These tiled clients access a number of small regions within an overall data structure, where an example data structure might include a two-dimensional surface. The accesses to the surface would be based on regional proximity of the data within the surface, rather than regional proximity of the data within the memory. It should be understood, however, that both types of memory clients are not relegated to performing sequential or regional accesses to the memory.

An example of a linear memory access includes accessing a particular line of a surface to be included in a graphical display or used in video capture. Another example of a linear memory access would include accessing a data construct in memory, such as a circular buffer. Linear memory accesses are not necessarily stringently sequential, and a linear access might include skipping a line or a number of data elements such that the overall access is not necessarily completely sequential.

An example of a tiled memory access would include accessing a small region of a three-dimensional drawing, where the small region equates to a graphics primitive, such as a triangle or rectangle. The data mapping the three-dimensional drawing is preferably stored in memory in a tiled format that groups localized areas of the drawing together in the memory. Another example of a tiled memory access might include retrieving a portion of an MPEG image for motion compensation processing.

In a typical memory structure, a number of pages will exist within the memory. Accesses to memory locations within a single page incur no timing penalty, however when accesses to different pages in a single bank of the memory occur, a page fault penalty is incurred. This page fault penalty is typically associated with the preparation time needed to prepare the memory to access the new page.

A page fault penalty associated with switching pages within one bank of the memory can be hidden if the other bank is simultaneously used to perform data transfer. This is a concept that can be applied to a number of different memory structures in order to improve efficiency of accesses.

One manner in which to ensure page faults are hidden includes placing restrictions on memory accesses such that they generally commence in a first bank and generally terminate in the second bank. By placing this restriction on memory clients, the memory controller can switch between various conforming clients in the system with the assurance that each memory access will begin in the first bank. Because each memory access for each conforming client terminates in the second bank, sequential memory access by any conforming clients in the system will "dovetail" together in a manner that ensures switching between banks with each new memory access. Switching between banks within the memory does not incur any timing penalty. As such, the ending portion of one memory access, which occurs in the second bank, can be utilized to hide a page fault timing penalty that may be incurred in the first bank by the initiation of the subsequent memory access. This timing penalty will be incurred any time a new memory access utilizes a different page from the previous memory access in the same bank.

Figure 2:
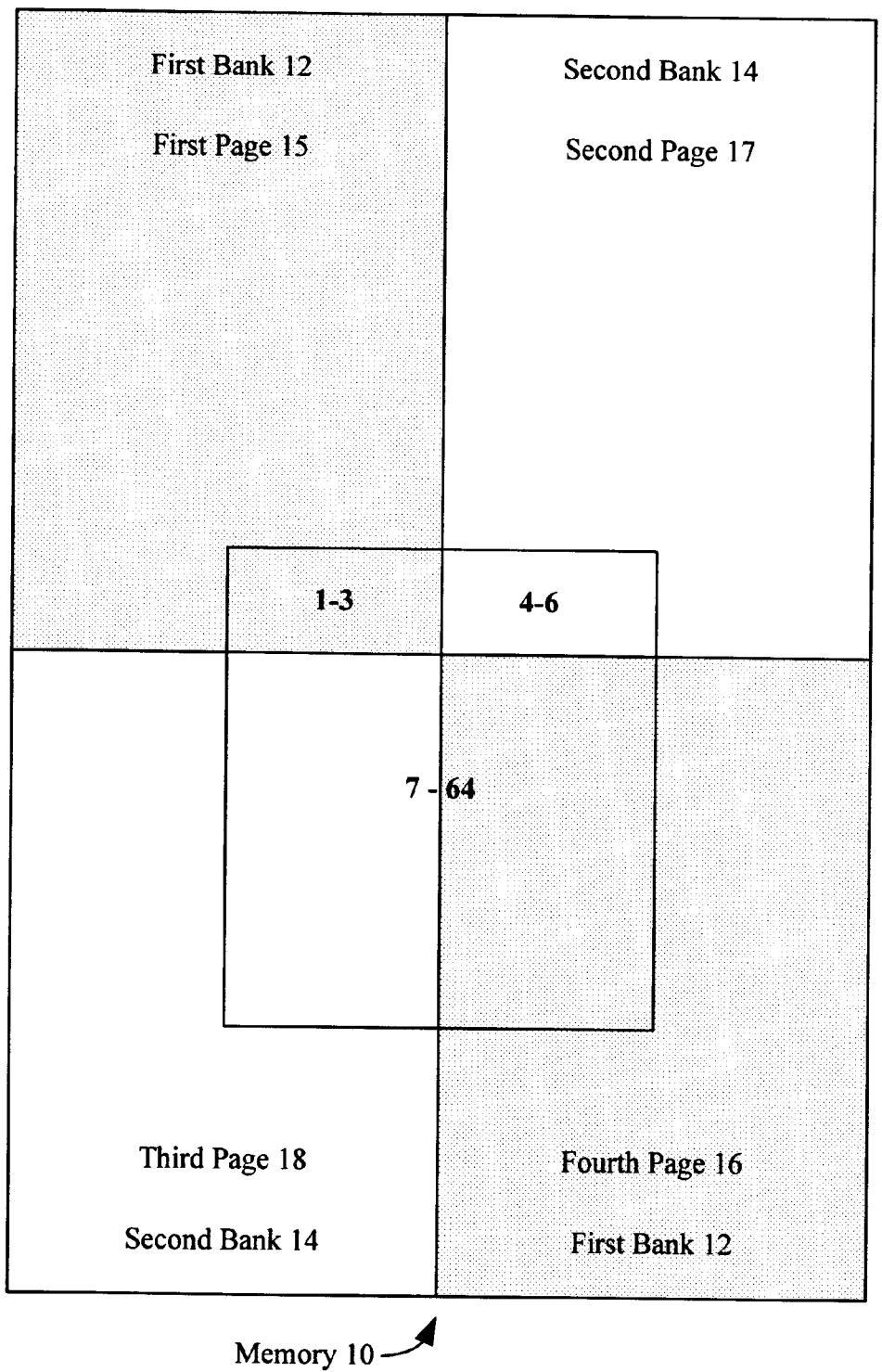
FIG. 2 illustrates a block diagram of a two-bank memory storing data that is accessed in accordance with the present invention.
Figure 3:
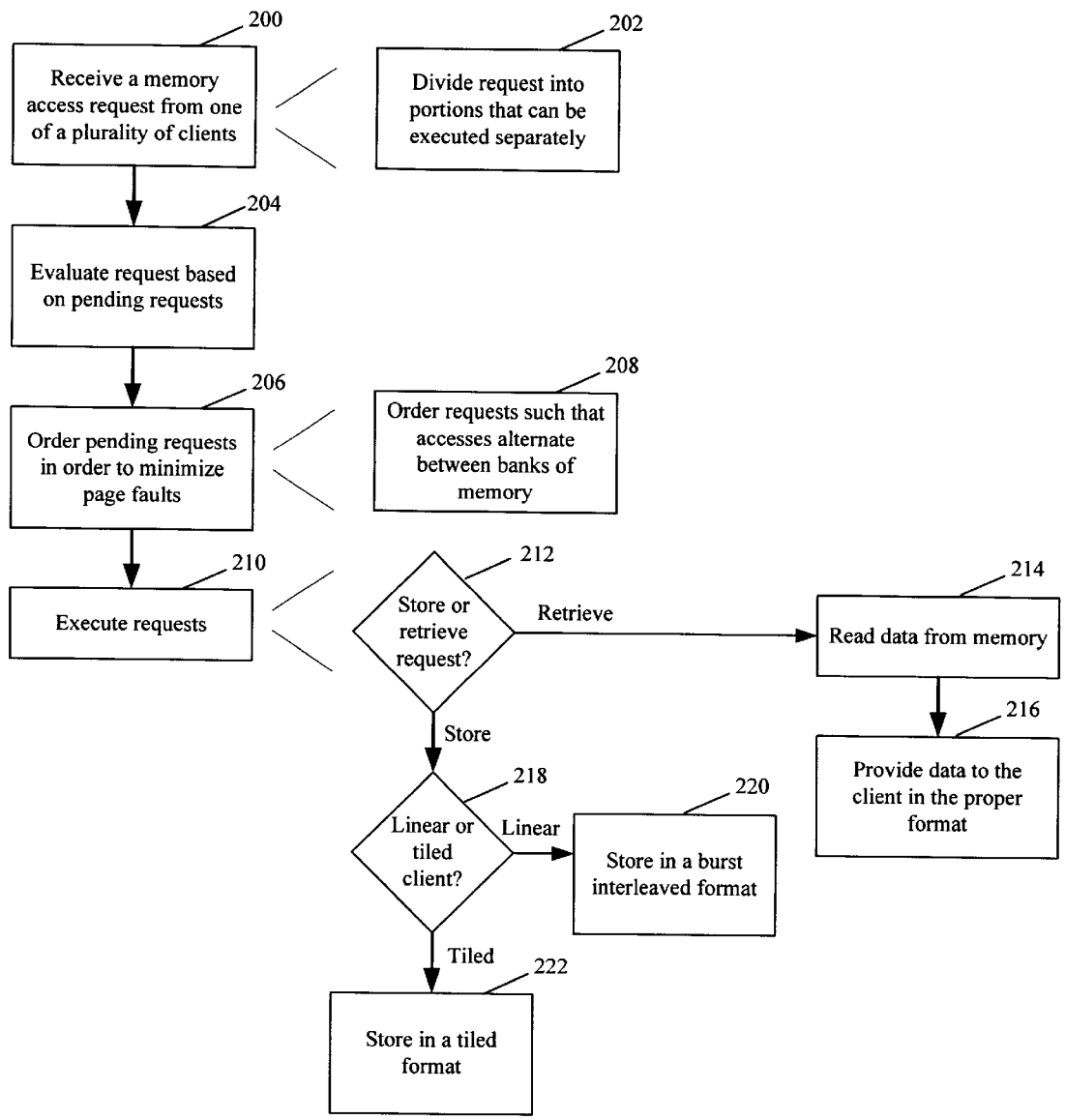
FIG. 3 illustrates a flow chart of a method for memory control in accordance with the present invention.

The invention can be better understood with reference to FIGS. 1–3. FIG. 1 illustrates a video graphics circuit that includes a memory 10, a memory controller 20, a graphics display engine 30, a video display engine 40, a merging block 50, a video image processor 60, a 3D graphics image processor 70, and a 2D graphics image processor 80.

In the system illustrated, the 2D graphics image processor 80 may perform rendering of two dimensional graphics images, whereas the 3D graphics processor 70 performs the processing required to display three dimensional graphics images. The video image processor 60 preferably receives and processes a video data stream for display. More preferably, the video image processor 60 includes an MPEG decoder where the MPEG decoder stores and retrieves the MPEG video data from the memory for processing and display. The graphics display engine 30 retrieves graphics information from the memory 10 and generates a display signal based on the retrieved graphics images. Similarly, the video display engine 40 retrieves video images from the memory 10 and generates a display output that includes the video images. The merging block 50 combines the display output from the graphics display engine 30 and the display output from the video display engine 40 to generate a combined video graphics display output 52. This display output may then be fed to a monitor or other display device.

The video graphics circuit illustrated in FIG. 1 may be included in a video graphics integrated circuit that is utilized in an application such as a set-top box. A set-top box would receive a data stream that includes both video and graphics information and process the data stream to provide a display that includes both video and graphics images. Preferably, this includes providing the video and graphics information to displays that would include a high definition television set (HDTV). In such a system, the incoming data stream would preferably include an MPEG video data stream for the HDTV video images, and the graphics information may either be included in the stream or generated by a processor that is included in the set-top box.

The memory 10 includes a first bank 12 and a second bank 14. The memory 10 is preferably a two bank synchronous dynamic random access memory (SDRAM), but it should be apparent to one skilled in the art that other types of memory structures or systems that allow for storage and retrieval of data in two separate banks could be used. In such a memory structure it is important that while operations are occurring in one of the banks, preparation for a new access to a new page may be occurring in the other bank.

The graphics display engine 30, video display engine 40, video image processor 60, 3D graphics image processor 70, and 2D graphics image processor 80 are all memory clients that perform memory accesses to the memory 10. Some of these memory clients are linear memory clients, and the data that these linear memory clients store in the memory 10 or retrieve from the memory 10 is formatted in the memory 10 in a linear fashion. Similarly some of the clients are tiled memory clients, and the data stored in the memory 10 or retrieved from the memory 10 by the tiled clients is formatted in the memory 10 in a tiled format. The memory clients illustrated in FIG. 1 are specific to a mixed video graphics system, and it should be apparent to one of ordinary skill in the art that additional clients maybe included in the system, or that other clients may be substituted for any number of the clients shown. Preferably, the system of FIG. 1 includes at least one linear memory client and at least one tiled memory client. However, it should be apparent to one of ordinary skill in the art that the memory storage techniques described herein would be applicable to systems that include only linear or only tiled memory clients.

Some memory clients may perform memory accesses that utilize both linear and tiled data stored in the memory 10. These combination memory clients store and retrieve the linear and tiled data from the memory 10 through the use of the memory controller 20. Preferably, in a video graphics system, graphics image processors such as the 3D graphics image processor 70 and the 2D graphics image processor 80 represent combination memory clients that may access either tiled or linear data in the memory 10. Linear clients of the system illustrated in FIG. 1 preferably include the graphics display engine 30, whereas tiled memory clients preferably include the video display engine 40 and the video image processor 60. Although graphics clients are typically linear clients, some graphics generation steps may include tiled memory accesses, such as those that would occur in accessing a texture that is stored in a tiled format in memory. Similarly, display engines are evolving such that they may treat the display in a tiled manner, thus making display engines perform accesses to the memory in a tiled manner to generate display data. The invention described herein does not limit the type of accesses performed by the various clients in a system, but rather arranges the various requested accesses in such a way as to maximize memory efficiency.

The memory controller 20 is operably coupled to the memory 10 and each of the plurality of memory clients. The memory controller 20 receives requests for memory access from the plurality of clients and organizes these requests in such a way as to minimize page faults. In order to perform these operations, the memory controller 20 preferably includes a scheduler 22 and a sequencer 24. The scheduler 22 receives the memory requests from the clients and orders the requests in the optimal sequence to minimize timing penalties associated with page faults. The sequencer 24 then issues the actual commands to the memory 10 such that data from the plurality of memory clients is stored in the memory 10, or data is read from the memory 10 and provided to the clients.

When the memory controller 20 receives a set of data from a linear memory client for storage in the memory, the memory controller 20 stores the linear data in the memory in a burst interleaved format. The burst interleaved format stores successive portions of the set of linear data in alternating banks of the memory. The size of the successive portions determined based on the page fault time. In other words, if the timing penalty associated with the page fault is six cycles, the size of the successive portions may be six or more quadwords, where the preferable number is eight or sixteen quadwords because power of two alignment is desirable in computer systems. Larger portions may be less desirable, as they reduce the granularity with which the memory controller 20 can toggle between clients. A quadword preferably includes eight bytes of data and requires one cycle to access. Thus, if a linear memory client had a block of 64 quadwords for storage in the memory 10, the memory controller 20 would store the first eight quadwords in the first bank 12, and the second eight quadwords in the second bank 14. This alternation of eight quadword blocks between the two banks of the memory would continue until all 64 quadwords had been stored.

When the memory controller 20 receives a set of data from a tiled memory client for storage in the memory, the memory controller 20 stores the set of tiled data in the memory in a tiled format such that successive, or abutting, tiles of the set of tiled data are stored in alternating banks of the memory. Thus, conceptually, such a memory is organized in a checkerboard fashion. Tiling is well known in the art. Preferably, the dimension of the tiles is also based on the page fault time. Thus if the page fault time is six cycles, the dimension, or width, of a memory tile may be eight quadwords where each quadword requires one cycle to be read or written. Thus, if the memory controller 20 received a 64 quadword block from one of the tiled memory clients, the memory controller 20 would group portions of the 64 quadword block together such that localized portions within the block were stored within a single tile in the memory. The first tile might include eight quadwords from the first row of the block or eight quadwords from the first two rows of the block. The width of the tile is determined such that it is large enough to enable the system to conceal a page fault while performing a memory access corresponding to the tile. This tile would be stored in the first bank 12. The second tile might include the third and fourth quadwords of each of the first four rows. This tile would be stored in the second bank 14. It should be noted that the tiles and the data blocks are not necessarily structured in a rectangular format.

When the memory controller receives a request to retrieve data from the linear clients and the tiled clients, the memory controller organizes the ordering of the read operations such that the page faults that may occur are hidden when possible. Typically in a system such as that illustrated in FIG. 1, the memory accesses from linear memory clients will be more regular and predictable than those of tiled memory clients. If accesses from tiled memory clients are more apt to be small accesses on multiple pages within the memory 10, then by realizing that a large linear memory access can be split into smaller accesses, it is possible for the memory controller 20 hide additional page faults. This is accomplished by interspersing a tiled memory access that incurs a page fault between the smaller accesses in such a way that the timing penalty associated with the page fault is effectively hidden.

For example, assume that a request comes in from a linear memory client such as the graphics display engine 30 to retrieve a 64 quadword sequence from the memory 10. Simultaneous with this memory request, a request is pending from a tiled memory client that includes three accesses to three separate pages within the memory 10. These accesses include access to data in both the first bank 12 and the second bank 14. In such a situation, the linear memory accesses maybe split into a number of smaller memory accesses. One of the smaller memory accesses may begin in the first bank 12 and terminate in the second bank 14. If the access to the second bank 14 is greater than the timing penalty associated with a page fault, one of the accesses for the tiled memory client may be initiated in the first bank 12 while the linear memory access is occurring in the second bank 14. Although the page fault timing penalty is incurred by the tiled memory access, while this timing penalty is being incurred the data for the linear client is being actively read from the second bank 14. As soon as the memory access from the second bank 14 for the linear client has completed, the memory access for the tiled client that has been initiated in the first bank 12 can proceed, with the timing penalty for the page fault having already been incurred. This is an example of effectively hiding a page fault.

By interspersing the remaining two tiled client accesses between the remaining portions of the linear client access, the page faults that are associated with these tiled memory accesses may also be concealed. Although the illustration described is for a linear client access that is both large and somewhat regular while the tiled memory accesses are more irregular and smaller in size, it should be apparent that the roles could be reversed. Therefore, linear memory accesses could be hidden within larger, more regular tiled memory accesses. Similarly, small linear or tiled memory accesses could be interspersed with larger tiled and or linear memory accesses in order to hide any page faults that must be incurred.

In another embodiment, the system as illustrated in FIG. 1 may be simplified such that it merely includes the memory 10, the memory controller 20, and at least one linear memory client. In such an embodiment, the client may be a graphics display engine or any other type of linear memory client that interacts through the memory controller 20 with other memory clients in order to access data within the memory. In such a system, the memory controller 20 receives data to be stored in the memory 10 from the linear client and stores the data in the memory 10 in the burst interleaved format which was described earlier. In some circumstances the data accesses by the linear memory client may not be broken up into optimally sized portions for the burst interleaving process, and page faults may still occur in data accesses requested by the client. By alternating banks when storing the data in the memory 10, the potential for hiding any page faults within an access by the client is greatly improved. This is especially true in light of the fact that in prior art systems, an entire set of linear data would be stored within a single memory bank, and no opportunity for hiding a page fault was presented.

In an example where one or more page faults within a memory access are hidden, the memory client may request a read that is in four separate pages within the memory 10. This is best illustrated in FIG. 2, which shows an example layout for a portion of the memory 10. In the example, the first page 15 and the fourth page 16 are part of the first bank 12, and the second page 17 and the third page 18 are part of the second bank 14.

The block of data that has been requested for access is illustrated such that three quadwords of the requested block are located within the first page 15, and three quadwords of the requested access are located within the second page 17. The remaining quadwords are split between the third page 18 and the fourth page 16. If these memory locations were accessed in a sequential, or convenient horizontal manner, page faults would likely occur because the small portions of data located within the first page 15 and the second page 17 are not large enough that an access to a different page in the opposing bank could not be initiated during these short memory accesses.

In order to hide the page faults, or the time associated when the memory must initiate an access to a new page within the memory, in the example illustrated, the memory controller 20 could begin accessing the memory on the third page 18 while a memory access to the first page 15 was initiated. Once a number of quadwords has been read from the third page 18 that is sufficient to conceal the timing penalty incurred by initiating an access to the first page 15, the access to the first page 15 maybe begun. Once these three memory locations within the first page 15 have been accessed, the memory controller 20 could then return to the third page, which is in the second bank. Because these locations are in the second bank and the first page is within the first bank, no timing penalty will be incurred. This is because the most recently accessed page within the second bank is the third page 18, which is the same page in which the additional data which needs to be accessed is located.

While the accesses to the locations in the third page 18 are completed, accesses to the fourth page 16 within the first bank 12 maybe initiated. Although the locations within the fourth page 16 are on a different page than those most recently accessed in the first bank 12, which were in the first page 15, the page fault associated with this new access will be hidden by the relatively large number of memory accesses that occur in the third page 18.

Once the data accesses to the fourth page 16 have begun, initiation of the memory accesses within the second page 17 can begin. Once the timing penalty associated with the page fault that will occur when accesses to the second bank 14 switches from the third page 18 to the second page 17 has been incurred, the accesses in the second page 17 can be performed. Once these accesses have completed, the accesses in the fourth page 16 can be completed, and once again no page fault will be incurred as the most recent accesses to the first bank 12 occurred within the fourth page 16.

It should be apparent to one of ordinary skill in the art that the memory accesses illustrated in FIG. 2 may be a number of memory accesses initiated by a number of memory clients, rather than a single block access by a single client. By selectively executing the memory accesses in an order that allows page faults to be hidden, a number of separate memory requests can be sequentially ordered, or "dovetailed", in such a way that allows page faults incurred by the memory accesses to be hidden in many cases.

FIG. 3 illustrates a flow chart of a method for memory control that may be used in a video graphics system that includes a plurality of memory clients. At step 200, a memory access request is received from one of a plurality of clients. Each of the plurality of clients issues memory requests that are serviced by the system implementing the method illustrated. Each of the plurality of memory clients access data in a memory, and memory accesses include read operations for data retrieval and write operations for data storage. The memory is preferably structured such that it includes at least a first bank and a second bank.

At step 202, the received memory access request may be divided into a number of smaller portions that can be executed separately. This allow pages faults to be better hidden by interspersing short memory accesses that incur page faults amongst longer memory accesses that provide the required memory access time to conceal the page fault.

At step 204, the received memory access request is evaluated based on other pending requests from other clients. The evaluation compares locations that will be accessed by each of the different memory requests to determine the optimal pattern to sequence the memory requests in order to both minimize page faults that are incurred and also to cause page faults that have to be incurred to be effectively hidden when possible.

At step 206 the pending requests are ordered based on the evaluation such that penalties associated with page faults are minimized. Preferably, this is accomplished at step 208 where requests are ordered in such a way that burst accesses alternate between the first and second bank of the memory. Because accesses to the first bank may occur while preparation for an access to the second bank simultaneously occurs, alternating between the two banks allows for page faults to be more effectively hidden. This concealment of the page fault penalties is the same as was described with respect to FIGS. 1 and 2.

At step 210, the requests are executed based on the ordering performed at step 206. Preferably, the execution of the requests includes step 212, where a specific request is evaluated to determine if it is a request to store data in the memory or a request to retrieve data from the memory.

If at step 212 it is determined that a retrieve request has been submitted for execution, the method proceeds to step 214 where the data is read from the memory. At step 216, the data is provided to the client in the proper format. What this implies is that if data has been stored in a tiled fashion within the memory, it will be untiled before it is provided to a client. Similarly, if the data is stored in some other format that does not reflect the desired format for a particular client, the data will be returned to this proper format before it is passed along to the client.

If at step 212 it is determined that a store memory request has been received, the method proceeds to step 218 where it is determined whether the store request has come from a linear memory client or a tiled memory client. If a linear memory client is determined as the source, the method proceeds to step 220 where the linear data from the linear client is stored in the memory in a burst interleaved format such that successive portions of the linear data are stored in alternating banks of the memory. This burst interleaving format is as was described with respect to FIGS. 1 and 2. The size of the successive portions of the linear data that are stored in the burst interleaved format is preferably based on the time associated with incurring a page fault in the memory. If it requires six clock cycles to recover from a page fault or to initiate an access to a new page, the size of the portions in which the linear data is divided will be at least of a size such that an access to a portion will allow the time associated with the page fault to expire.

If it is determined at step 218 that a tiled client is requesting that data be stored in the memory, the method proceeds to step 222 where data from the tiled memory client is stored in the memory in a tiled format. Storage of the data in the tiled format within the memory is as was described with respect to FIG. 1. Thus, when tiled data from a tiled memory client is received, it is stored in the memory in the tiled format such that successive tiles of the tile data are stored in alternating banks of the memory. Preferably, the size of the tiles is determined based on the page fault time such that an access to a single tile consumes as many clock cycles as are present in the penalty incurred from a page fault.

As with respect to FIG. 1, the memory utilized by the method illustrated in FIG. 3 is preferably of a type such that while an execution to one bank of the memory is occurring, an access to the opposing bank within the memory can be initiated or prepared. This allows an access to occur in one bank of the memory while the operations to initiate an access to a new page that incurs a page fault is occurring in the opposite bank. By intelligently ordering the pending requests received from the plurality of clients such that page faults are both minimized, and hidden when they are unavoidable, the efficiency of memory accesses in the system can be greatly increased. This is especially true in complex systems where numerous clients must interact and access the same memory structure to retrieve data.

An example system that includes a number of memory clients is a video graphics system that displays real time video along with graphical display elements. In this case, the plurality of memory clients that access the memory would include at least a display output engine, a video image processor, and graphics processor. As was illustrated with respect to FIG. 1, the display output engine may further include a video display engine and a graphics display engine the outputs of which are merged before being provided to a display. In such a system, the demands of the video display portions of the system will be paramount and therefore the efficiency of both the video portion and the graphics portion will be important. By increasing the efficiency of the memory accesses by these memory clients, additional memory bandwidth does not have to be provided, which would increase system costs. Similarly, the corruption of the video data stream which may be associated with the inability to access memory when required will be avoided.

As was described with respect to FIGS. 1 and 2, the understanding that a linear memory access client will typically perform more structured and orderly memory accesses can be leveraged to allow the more sporadic and inconsistent memory accesses of a tiled client to be implemented more efficiently. This is accomplished by hiding the page faults incurred by the tiled memory client through intermingling of the tiled memory accesses with the linear memory accesses.

Thus in a system such as a video graphics circuit implemented as part of an HDTV set-top box that includes both linear and tiled memory clients that process video and graphics data for display, the method and apparatus described herein can greatly benefit the efficiency of the system without increasing costs. This is because memory structures within the circuit can be shared by both the video and graphics elements without requiring the additional bandwidth that might be required if page faults were incurred on a regular basis.

It should be apparent to one skilled in the art that the techniques of both eliminating and hiding page faults can be easily extended to memory structures that have more than two banks of memory. For example, in a four bank memory structure, linear data and tiled data may be dispersed between all four banks of the memory such that page faults that occur due to other memory accesses within the system are easier to hide. The general concept of initiating a memory access to a bank within the memory while performing a memory access within another bank to hide or mask a page fault is a concept that can be applied to a number of different memory structures in order to improve efficiency of accesses.

It should be understood that the implementation of other variations and modifications of the invention in its various aspects should be apparent to those of ordinary skill in the art, and that the invention is not limited to the specific embodiments described. For example, additional processing of the data may be performed within the memory controller in addition to the potential tiling operations that are performed. It is therefore contemplated to cover by the present invention, any and all modifications, variations, or equivalents that fall within the spirit and scope of the basic underlying principles disclosed and claimed herein.

What is claimed is:

1. A video graphics circuit comprising:
   a memory having at least a first bank and a second bank;
   at least one linear memory client, wherein linear memory clients store and retrieve data stored in the memory in a linear format
   at least one tiled memory client, wherein tiled memory clients store and retrieve data stored in the memory in a tiled format; and
   a memory controller operably coupled to the memory, the linear memory client, and the tiled memory client,
      wherein when the memory controller receives a set of data from linear memory clients to store in the memory, the memory controller stores the set of linear data in the memory in a burst interleaved format such that successive portions of the set of linear data are stored in alternating banks of the memory, wherein size of the successive portions is determined based on a page fault time,
      wherein when the memory controller receives a set of data from tiled memory clients to store in the memory, the memory controller stores the set of tiled data in the memory in a tiled format such that successive tiles of the set of tiled data are stored in alternating banks of the memory, wherein a dimension of the tiles is determined based on the page fault time,
      wherein when the memory controller receives a request to retrieve data from linear clients and from tiled clients, the memory controller structures reads from the memory such that page faults are hidden.

2. The video graphics circuit of claim 1, wherein the memory controller untiles tiled data read from the memory and provides it to tiled memory clients in a non-tiled format.

3. The video graphics circuit of claim 1, wherein the at least one tiled memory client includes a video image processor, wherein the video image processor stores and retrieves tiled data that includes a tiled representation of a video image.

4. The video graphics circuit of claim 3, wherein the video image processor further comprises an MPEG decoder, wherein the MPEG decoder stores and retrieves MPEG video data.

5. The video graphics circuit of claim 1 further comprises at least one combination memory client, wherein combination memory clients store and retrieve linear and tiled data using the memory controller.

6. The video graphics circuit of claim 5, wherein the at least one combination memory client includes a graphics image processor that generates graphics images that the graphics image processor stores and retrieves image data using the memory controller.

7. The video graphics circuit of claim 1, wherein the at least one tiled memory client includes a video display engine, wherein the video display engine reads tiled data using the memory controller, wherein the video display engine generates a video display signal.

8. The video graphics circuit of claim 1, wherein the at least one linear memory client includes a graphics display engine, wherein the graphics display engine reads linear data using the memory controller, wherein the graphics display engine generates a graphics display signal.

9. The video graphics circuit of claim 1, wherein the memory controller further comprises:
   a scheduler, wherein the scheduler receives memory access requests from linear and tiled clients, and wherein the scheduler determines ordering of the memory access requests; and
   a sequencer operably coupled to the scheduler, wherein the sequencer issues memory commands to the memory based on the memory access requests.

10. The video graphics circuit of claim 9, wherein the scheduler breaks up selected memory access requests into smaller requests, wherein the scheduler determines ordering of the memory access requests such that smaller requests of a selected memory access request are performed non-sequentially.

11. The video graphics circuit of claim 9, wherein the scheduler interleaves tiled memory access requests with linear memory access requests to minimize timing penalties associated with page faults.

12. The video graphics circuit of claim 1, wherein the memory is a two-bank synchronous dynamic random access memory, wherein during a memory access to the first bank, preparation for a subsequent second bank access occurs, and wherein during a memory access to the second bank, preparation for a subsequent first bank access occurs.

13. A method for memory control comprising:
   receiving a plurality of memory access requests from a plurality of memory clients, wherein each of the plurality of memory clients accesses a memory, wherein the memory includes at least a first bank and a second bank;
   performing the plurality of memory access requests in a sequence that minimizes penalties associated with page faults,
      wherein store memory access requests from linear clients of the plurality of clients are performed in such a way that linear data from the linear clients are stored in the memory in a burst interleaved format such that successive portions of the linear data are stored in alternating banks of the memory, wherein the size of the successive portions is determined based on a page fault time,
      wherein store memory access requests from tiled memory clients of the plurality of clients are performed in such a way that tiled data from the tiled clients is stored in the memory in a tiled format such that successive tiles of the tiled data are stored in alternating banks of the memory, wherein a dimension of the tiles is determined based on the page fault time,
      wherein retrieve memory access requests are performed such that data stored in the memory is presented to the plurality of clients in a format that matches a format corresponding to store memory access requests received from each of the plurality of clients.

14. The method of claim 13, wherein performing further comprises ordering execution of memory access requests such that accesses to the first bank of the memory preferably follow accesses to the second bank of the memory and such that access to the second bank of the memory preferably follow accesses to the first bank of the memory.

15. The method of claim 14, wherein ordering execution of memory access requests further comprises ordering execution of memory access requests such that a page fault in one bank of the memory is hidden by a memory access to another bank of the memory.

16. The method of claim 15, wherein performing further comprises dividing accesses of memory access requests into access portions, wherein execution of access portions of memory access requests are ordered in a non-sequential manner in order to minimize the penalties associated with page faults.

17. The method of claim 13, wherein receiving a plurality of memory access requests from a plurality of memory clients, further comprises receiving a plurality of memory access requests from a plurality of memory clients in a video graphics system, wherein the plurality of memory clients includes a display output engine, a video image processor, and a graphics processor.

18. A memory controlling circuit comprising:
   a memory having a first bank and a second bank, wherein the memory stores linear data in a burst interleaved format, wherein the burst interleaved format stores successive portions of the linear data in alternating banks of the memory, wherein size of the successive portions is determined based on a page fault time;
   a client that performs linear memory accesses; and
   a memory controller operably coupled to the memory and the client, wherein the memory controller receives requests from the client and accesses the memory based on the requests, wherein the memory controller determines ordering of the memory access requests such that smaller requests of a selected memory access request are performed non-sequentially.

19. The memory controlling circuit of claim 18, wherein the client is a graphics display engine, and wherein the linear data includes graphics data, wherein the graphics display engine reads the graphics data from the memory using the memory controller, and wherein the graphics display engine produces a display output signal based on the graphics data.

20. The memory controlling circuit of claim 18, wherein the memory is a two-bank synchronous dynamic random access memory, wherein during a memory access to the first bank, preparation for a subsequent second bank access occurs, and wherein during a memory access to the second bank, preparation for a subsequent first bank access occurs.

* * * * *